United States Patent [19]
Reyes

[11] Patent Number: 5,236,243
[45] Date of Patent: Aug. 17, 1993

[54] SERGE THREAD LOOP FASTENER FOR TRIM COVER

[75] Inventor: Richard M. Reyes, Mt. Clemens, Mich.

[73] Assignee: General Motors Corporation, Detroit, Mich.

[21] Appl. No.: 859,791

[22] Filed: Mar. 30, 1992

[51] Int. Cl.⁵ ............................................. A47C 27/00
[52] U.S. Cl. ...................................... 297/218; 24/442
[58] Field of Search ............... 297/218, 291; 24/445, 24/442, 306, 450

[56] References Cited

U.S. PATENT DOCUMENTS

| | | | |
|---|---|---|---|
| 3,603,639 | 9/1971 | Wilson | 297/219 |
| 4,012,544 | 3/1977 | Richards | 428/95 |
| 4,776,636 | 10/1988 | Pyle et al. | 297/218 X |
| 4,920,235 | 4/1990 | Yamaguchi | 24/450 X |
| 5,028,472 | 7/1991 | Gray | 297/219 X |
| 5,101,539 | 4/1992 | Kennedy et al. | 24/442 |

FOREIGN PATENT DOCUMENTS

| | | | |
|---|---|---|---|
| 210860 | 2/1987 | European Pat. Off. | 297/218 |
| 1320876 | 2/1963 | France | 297/219 |
| 1053759 | 1/1967 | United Kingdom | 297/219 |

OTHER PUBLICATIONS

P. 1 of the instant patent application (G-6372).

Primary Examiner—Laurie K. Cranmer
Attorney, Agent, or Firm—William A. Schuetz

[57] ABSTRACT

A seat assembly has a seat cushion provided with hook strip fasteners located at the bottom of recesses in the cushion. A trim cover has selvage end projections at adjacently sewn together panels provided with a serge seam formed by overcast stitching a fiber thread therealong. The serge seam provides a loop fastener strip for attaching to the hook strip fasteners when the trim cover is placed over the cushion and the trim cover pressed into place.

8 Claims, 3 Drawing Sheets

SERGE THREAD LOOP FASTENER FOR TRIM COVER

The present invention relates to a seat assembly in which a trim cover is attached to a seat cushion by a hook and loop fastener means and, more particularly, to a loop fastener which is formed by overcast stitching a fiber thread to provide a serge seam along a selvage end projection of adjacently sewn together panels of the trim cover.

Hook and loop fasteners for attaching trim covers to seat cushions have heretofore been used. In seat cushions having a central seating portion and side bolster and front portions defined by elongated recesses, it has been common to provide hook strip fasteners located along the bottom on the recesses. These fasteners have their hooks extending into the recesses and are either adhesively secured to the bottom on the recesses or are molded in place in the foam cushion during the molding operation to form the foam cushion. The trim covers have comprised multi-panel covers whose adjacent side edges are abutted and sewn together to form selvage ends which would extend along the recesses in the foam cushion and mate therewith. The trim covers at and along their selvage end projections had sewn thereover a loop strip fastener. The trim cover was attached to the foam cushion by aligning the trim cover loop strip fasteners with the hook fasteners in the recesses in the foam cushion and then pressing the trim cover in place and with the loop fasteners lockingly engaging the hooks on the hook strip fastener on the foam cushion.

In accordance with the provisions of the present invention, the loop strip fastener previously employed and which had to be sewn along both sides of the selvage end projections of the trim panels has been eliminated and a serge seam extending along the selvage end projections has been provided instead. The serge seam is formed by loosely overcast stitching a fiber thread therealong, preferably a plastic fiber thread. When the serge seams along selvage end projections of the trim cover are pressed into the recesses in the foam cushion the serge seams lockingly engage the hooks on the hook strip fasteners.

The advantages of the present invention are that (1) it eliminates the need for a loop strip fastener, which is more costly than the thread of the serge seam, and (2) the serge seam can be stitched onto the selvage ends of the trim panels at the same time the selvage ends are sewn together which eliminates a separate sewing operation which was heretofore required for a loop strip fastener to be sewn over the selvage ends.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 4:
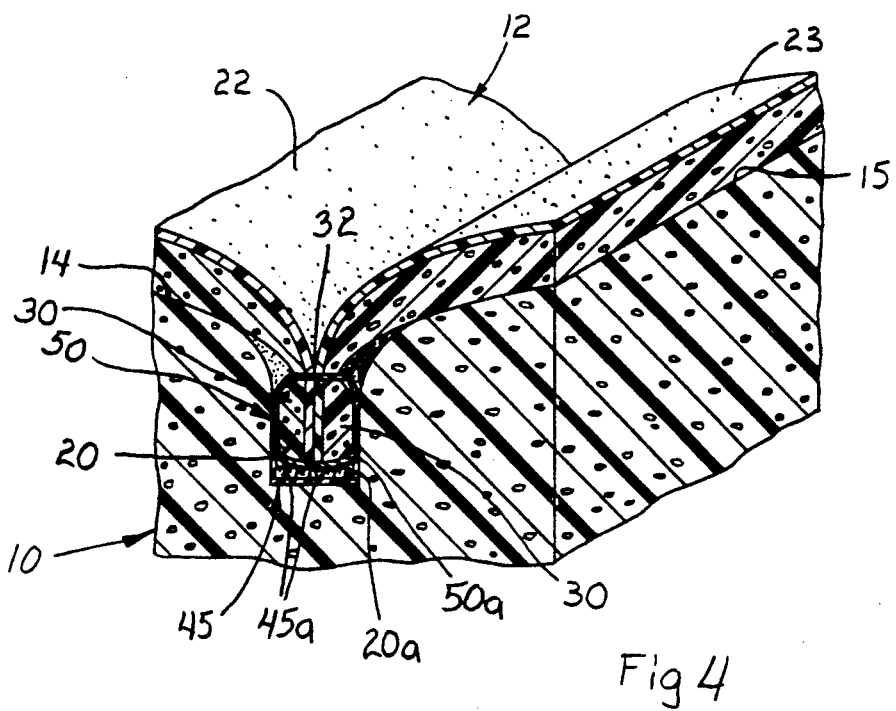
Figure 5:
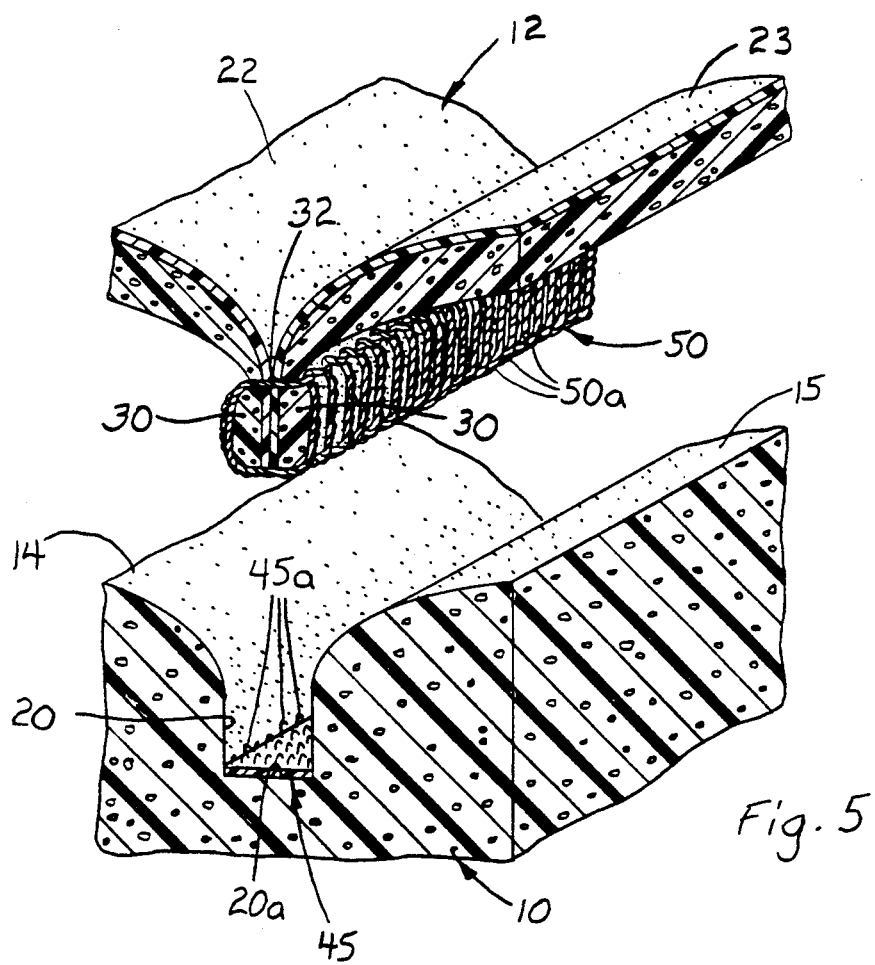

FIG. 4 is an enlarged fragmentary cross sectional view of a seat cushion and trim cover assembly having trim panels whose adjacent ends are sewn together to form a selvage end projection and which is also sewn with a serge seam therealong in accordance with the preferred embodiment of the present invention; and FIG. 5 is a fragmentary exploded perspective view of the seat cushion and trim cover shown in FIG. 4 prior to being connected together.

Figure 1:
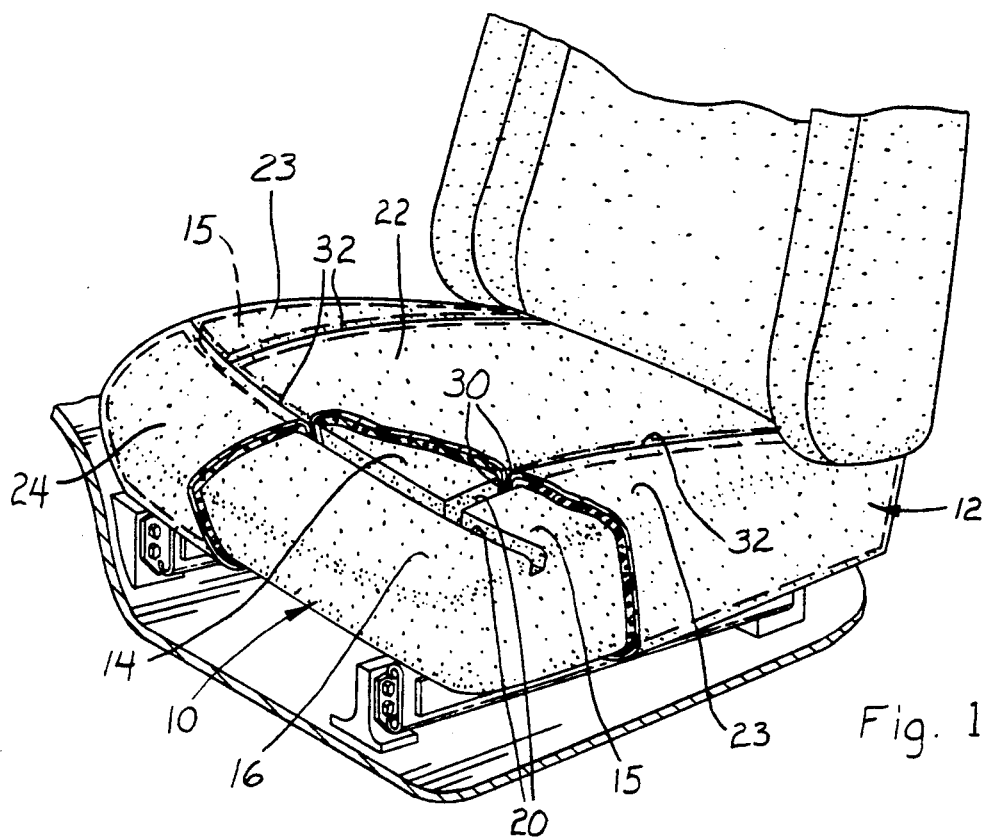
FIG. 1 is a fragmentary perspective view of a seat cushion and trim cover.

Referring to the drawings, FIG. 1 shows a seat cushion unit comprising a foam seat cushion or cushion unit 10 having a trim cover assembly 12 secured thereover. The foam seat cushion 10 is molded so as to have a central seating portion 14, raised side portions 15 and a raised front portion 16. The portions 14, 15 and 16 are defined by elongated, substantially rectangularly shaped recesses 20 molded into the seat cushion 10 during the molding operation. The recesses 20 are of a predetermined depth and have bottoms 20a which face upwardly toward the top surface of the seat cushion.

The trim cover 12 comprises multi-panels including a center panel 22, side panels 23 and a front panel 24. The panels 22, 23 and 24 are shaped complementary with the portions 14, 15 and 16 of the seat cushion 10. As is conventional, the panels 22, 23 and 24 have their adjacent side edges abutted to form selvage ends 30 which are sewn together so as to define a selvage end projection extending downwardly or away from the bottom face of the trim cover. The sewn-together ends 30 of the adjacent panels of the trim cover 12 define a seam 32 along its top face or surface.

Figure 2:
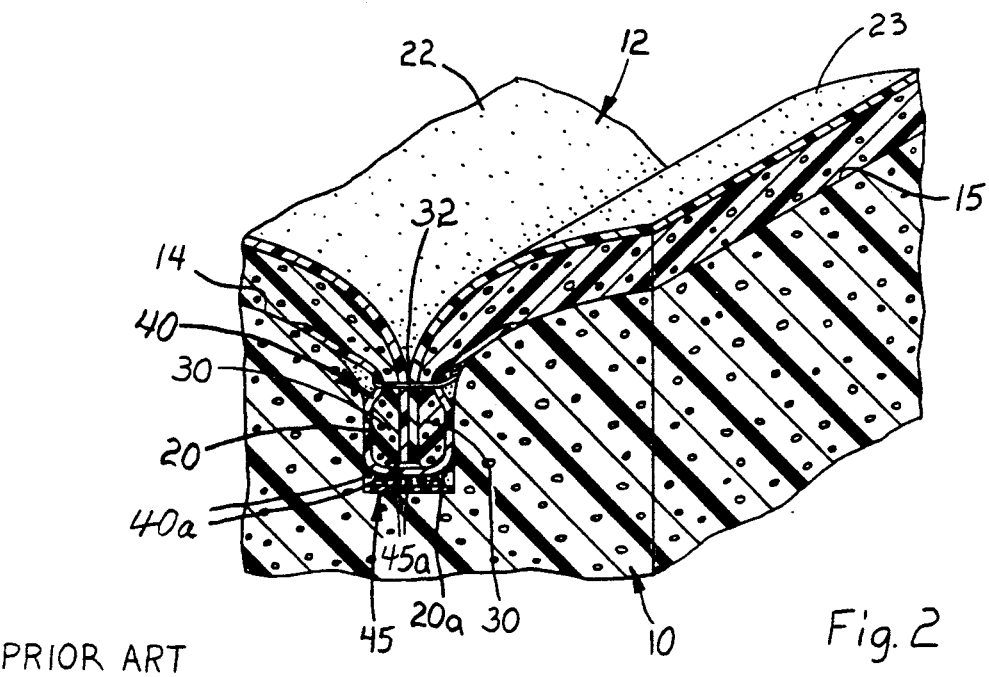
FIG. 2 is an enlarged fragmentary cross sectional view of a seat cushion and two panels of a trim cover and showing its adjacent ends abutted to form a selvage end and showing a loop strip fastener secured to the trim cover and covering the selvage ends of the panels in accordance with the prior art.
Figure 3:
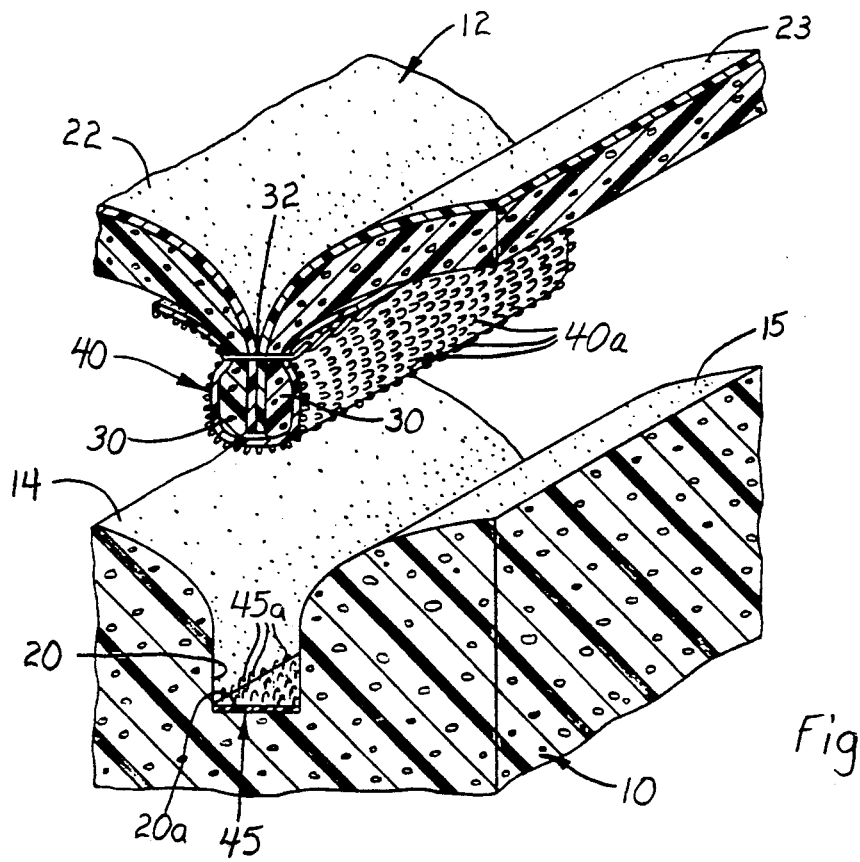
FIG. 3 is a fragmentary exploded perspective view of the prior art foam cushion and loop strip fastener secured to the trim cover prior to being connected together.

The trim cove 12 is adapted to be held in place on the foam cushion by a hook and loop fastener means. As shown in FIGS. 3 and 4, in the prior art hook and loop fastener means, the trim cover 12 had a loop strip 40 sewn to its underside and which covered the selvage end projections 30 of the trim cover panels along their entire length. The loop strip fastener 40 was sewn to the adjacently abutted panels of the trim cover 12 along both sides of the end projections 30. The foam cushion 10 had a hook strip fastener 45 either adhesively secured to the bottom 20a of the recesses 20 or had its backing molded into the cushion 10 during the molding operation for the foam cushion so as to be molded in place. The hook strips, besides the backing, had a multiplicity of individual hooks 45a extending transversely thereof and projecting into the recess 20. The trim covers 12 were secured to the foam cushion 10 by aligning the loop strip fasteners 40 with the recesses 20 on the foam cushion 10, as shown in FIG. 3, and then pushing the trim cover 12 in place, as shown in FIG. 2, and with the loops 40a of the loop strips 40 firmly engaging and locking onto the hooks 45a of the hook strip fasteners 45 secured or molded in place on the foam cushion 10.

In accordance with the provisions of the present invention, the loop strip fasteners 40 heretofore sewn to the underside of the trim cover 12 have been eliminated and serge seams 50 (see FIG. 5) sewn along the selvage ends 30 have been substituted therefor. In all other respects, the cushion 10, hook fastener strips 45 and trim covers 12 are identical to that previously used, as shown in FIGS. 2 and 3. The serge seam 50 extends along the entire length of the selvage end projection 30 and is formed by loosely overcast stitching a fiber thread 50a therealong. The overcast stitching is end-over-end and with there being approximately or a minimum of 14-18 stitches per inch along the longitudinal extent of the selvage end projection 30 of the adjacent panels of the trim cover 12. The thread of the serged seam is preferably made from a synthetic plastic material, such as polyester, nylon or rayon. It could also be made of a soft finished cotton thread. A suitable polyester thread could be the thread sold under the tradename Krystal Plus, number 600 or 800, and manufactured by American and Efird, Inc., Mt. Holly, N.C.

The trim cover 12 with the serge seams 50 is secured to the cushion 10 by aligning the serge seams 50 with the recesses 20 in the cushion 10, as shown in FIG. 5, and then pushing or pressing the trim cover 12 downwardly along its outer seams 32 so that the serge seams 50 engage the hooks 45a of the hook strip fasteners 45, as shown in FIG. 4, and with the threads 50a of the serge seam 50 locking onto the hooks 45a of the hook strip fastener 45.

Preferably, the material used for the thread would have the following minimum requirements:

| Physical Properties | |
|---|---|
| 1. Tensile | 7# |
| 2. Elongation | 33-40% |
| 3. Ply | 4 |
| 4. Twist | Left |
| 5. Twists Per Inch | 1(2-3) |
| 6. Bond | 0 |
| 7. Lube | 8-12% |
| 8. Textile Size (denier) | 105 |

The advantages of using the serge seam thread 50 in place of the previously used loop strip fastener 40 is that it is less expensive than the loop strip fastener material, it can be sewn in place at the same time that the ends of the adjacent trim panels are sewn together in a single operation, thus eliminating a separate sewing operation as is required for the loop strip fastener 40. In addition, it has been found, that the locking strength between the threads of the serge seam 50 and the hooks 45a of the hook strip fasteners 45 is equal to or exceeds that of using the previous loop strip fasteners 40.

Although the illustrated embodiment has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a seat assembly having a foam cushion provided with at least one elongated recess whose bottom faces outwardly of the cushion,
    a hook strip fastener whose back is secured to said foam cushion along the bottom of said recess and whose hooks extend into said recess,
    a trim cover having top and bottom surfaces and comprising a plurality of cover portions whose adjacent side edges are abutted and sewed together to define a selvage end projection extending transversely of said bottom side,
    and means secured to said trim cover along said selvage projection for engaging and locking to said hook strip fasteners when said projection is aligned with and pressed into said recess, the improvement being that said last named means comprises a serge seam along said selvage end projection formed by overcast stitching a fiber thread therealong, said serge seam lockingly engaging said hooks of said strip fastener when said projection is pushed into said recess.

2. In a seat assembly, as defined in claim 1, and wherein said fiber thread is a soft finished cotton thread having at least four plies.

3. In a seat assembly, as defined in claim 1, and wherein said fiber thread is of a synthetic plastic material having at least four plies.

4. In a seat assembly having a foam cushion provided with elongated recesses whose bottoms face outwardly of the cushion,
    hook strip fasteners whose back is secured to said foam cushion along the bottom of said recesses and whose hooks extend into said recesses,
    a trim cover having top and bottom surfaces and comprising a plurality of cover portions whose adjacent side edges are abutted and sewed together to define a selvage seam projecting transversely of said bottom side,
    and means secured to said trim cover along said projecting selvage seam for engaging and locking to said hook strip fasteners when said selvage projection is aligned with and pressed into said recesses, the improvement being that said last named means comprises a serge seam along said selvage projection formed by loosely overcast stitching a synthetic multi-ply fiber thread therealong, said serge seam lockingly engaging said hooks of said strip fastener when said selvage projection is pushed into said recesses.

5. In a seat assembly, as defined in claim 4, and wherein said fiber thread is made from polyester.

6. In a seat assembly, as defined in claim 4, and wherein said fiber thread is made from nylon.

7. In a seat assembly, as defined in claim 4, and wherein said fiber thread is made from rayon.

8. In a seat assembly, as defined in claim 4, and wherein said serge seams has a minimum of 14-18 stitches per inch, a minimum denier of at least 105, a minimum tensile strength of at least 7 pounds and a minimum elongation of at least 33 percent.

* * * * *